J. M. CALKINS.
DIRIGIBLE LIGHTING APPARATUS FOR VEHICLES.
APPLICATION FILED APR. 30, 1919.

1,315,463.

Patented Sept. 9, 1919.
2 SHEETS—SHEET 1.

Witnesses:

Inventor
James M. Calkins
By Frederick Whyn atty

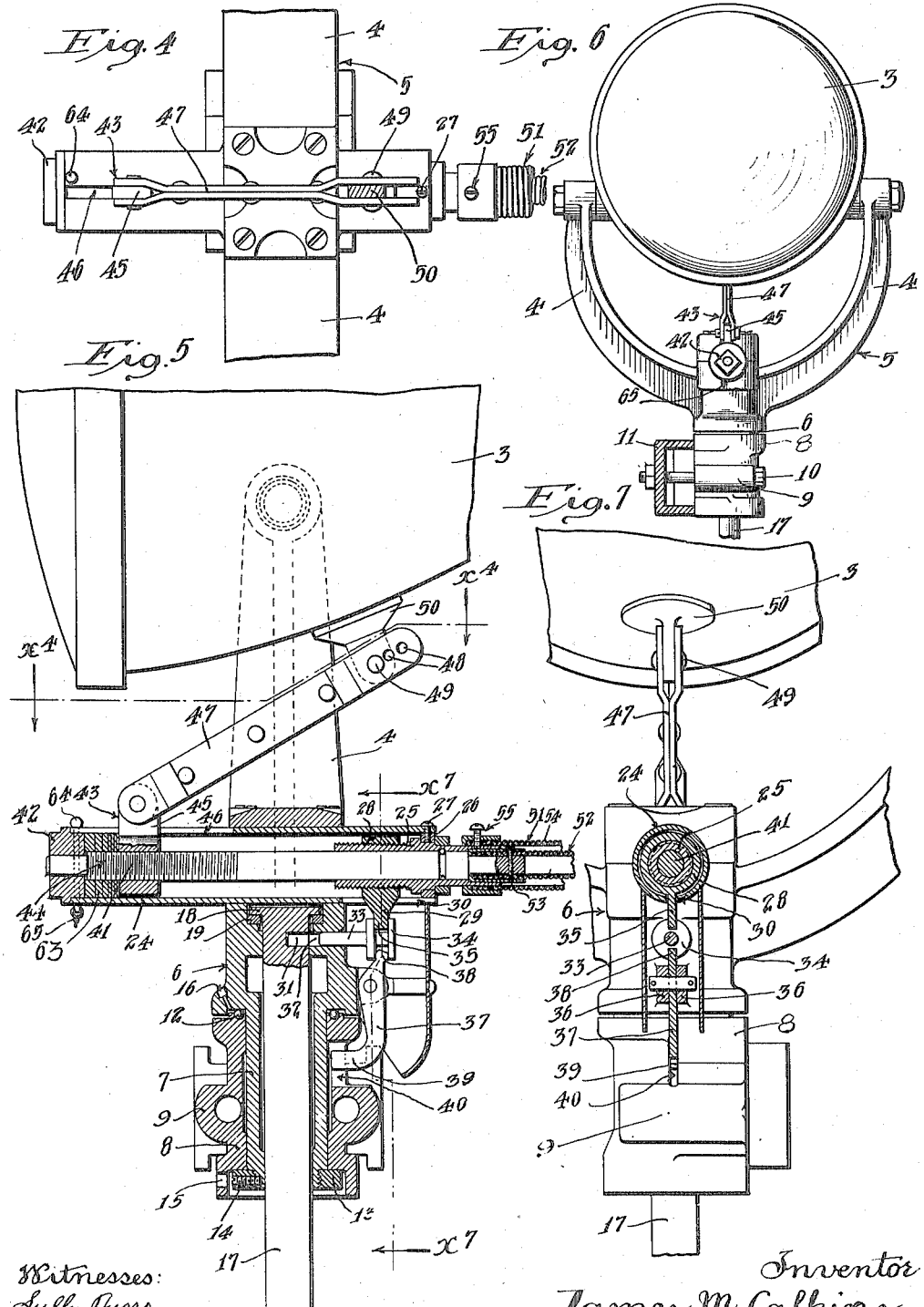

UNITED STATES PATENT OFFICE.

JAMES M. CALKINS, OF LOS ANGELES, CALIFORNIA.

DIRIGIBLE LIGHTING APPARATUS FOR VEHICLES.

1,315,463.      Specification of Letters Patent.      Patented Sept. 9, 1919.

Application filed April 30, 1919. Serial No. 293,659.

*To all whom it may concern:*

Be it known that I, JAMES M. CALKINS, a citizen of the United States, residing at Los Angeles, in the county of Los Angeles, State of California, have invented a new and useful Dirigible Lighting Apparatus for Vehicles, of which the following is a specification.

This invention relates generally to the lighting apparatus of motor vehicles adapted to cast a beam of light in front of the vehicle and particularly to apparatus for conveniently manipulating and adjusting the headlights of motor vehicles so that a beam of light may be directed as desired.

Among the objects of this invention is to provide an apparatus of the character referred to which will be adapted for conveniently varying the direction of the beam of light from automobile headlights, either in a vertical plane or in a horizontal plane, and, if desired, an adjustment in each of the planes simultaneously.

Another object of this invention is to provide an apparatus whereby, at the will of the operator, the headlights of an automobile may be connected with the steering apparatus of the automobile to turn horizontally in conjunction with the front wheels of the automobile.

Another object of this invention is to provide means for vertically varying the direction of the beam of light from automobile headlights within previously determined limits.

Another object of this invention is to provide an apparatus of the character referred to which may be operated conveniently and easily from the driver's seat of the automobile.

Another object of this invention is to provide an apparatus for vertically varying the beam of light cast by automobile headlights which may be so constructed that the apparatus may be sealed by certain state officials so that the position of the automobile headlights can be varied only to the extent that a ray of light will be cast within certain prescribed limits.

Another object of this invention is to provide an apparatus of the character referred to which will be simple and easy in operation and durable and positive in construction.

In the accompanying drawings:

Fig. 4 is a sectional view taken on a line indicated by $x^4$—$x^4$ in Fig. 5.

Fig. 5 is a vertical detail view partially in section of one of the lamp supports and connecting means.

Fig. 6 is a front elevation of one of the automobile headlights illustrating the bracket support for the same.

Fig. 7 is a sectional elevation taken on the line indicated by $x^7$—$x^7$ in Fig. 5.

Figure 1:
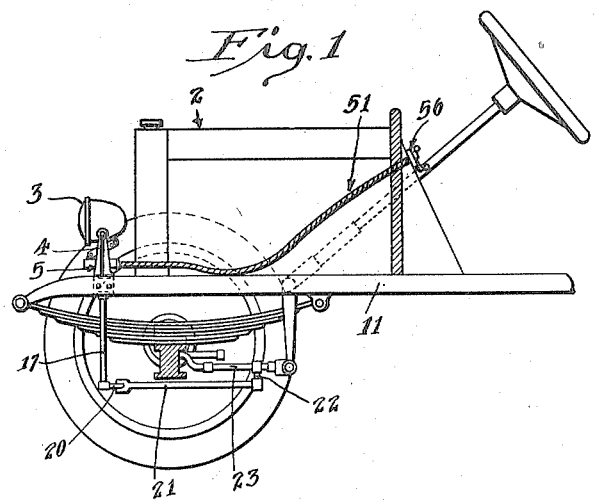
Figure 1 is a diagrammatic side view illustrating the invention in operative connection with a motor vehicle.
Figure 2:
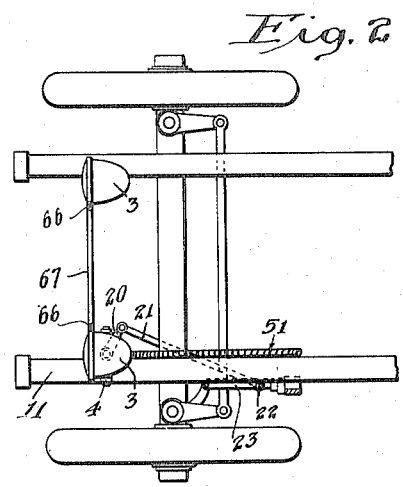
Fig. 2 is a diagrammatic horizontal view illustrating the connection between the headlights of the motor vehicle and the steering apparatus of the same.
Figure 3:
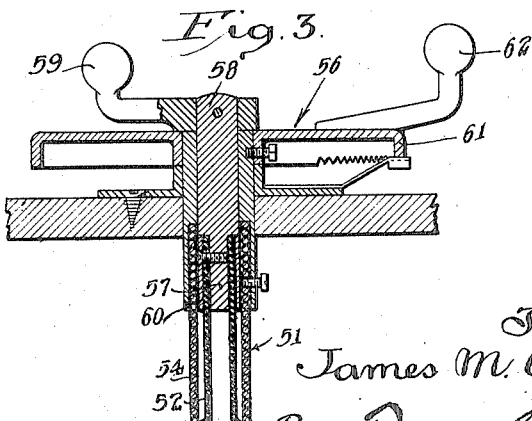
Fig. 3 is a sectional view of the operator's control.

Referring to the drawings, 2 indicates a motor vehicle provided with a pair of headlights 3. The headlights 3 are pivotally mounted between the arms 4 of U-shaped brackets 5.

One of the U-shaped brackets 5 is formed with a stem 6, which stem has a circular reduced portion 7 at its lower end. A hanger 8 is provided with bosses 9, which bosses are apertured to receive securing means 10. The securing means 10 rigidly connect the hanger 8 to the channel frame member 11 of the vehicle 2.

The hanger 8 is vertically and centrally apertured to revolubly receive the circular reduced portion 7 of the stem 6. The stem 6 is adjustably mounted within the hanger 8 upon anti-friction rollers 12 mounted at the top of the hanger 8. The lower end of the stem 6 is threaded to receive an adjusting collar 13, which collar is screw threaded onto the stem 6 within the enlarged aperture at the bottom of the bracket 8, and provides a means for adjusting the stem 6 upon the rollers 12. The collar 13 is fixed at a desired point to the bottom of the stem 6 by a set screw 14 which may be actuated through a port 15 formed in the lower end of the bracket 8. An oil inlet 16 communicates through the stem 6 with the rollers 12 and provides a means of lubricating the rollers.

The lower end of the stem 6 is centrally apertured to revolubly receive a spindle 17, which spindle is vertically suspended therein by means of an enlarged collar 18 formed on its upper end, which collar is suspended upon an antifriction bearing 19 mounted within a counter-bore in the stem 6.

The lower end of the spindle 17 is connected to an arm 20 which, in turn, is pivotally secured to a horizontal rod 21. The horizontal rod 21 is connected by means of a link 22 to the steering arm 23 of the vehicle 2. By means of these various connections the spindle 17 will be rotated coincident with a turning of the front wheels of the vehicle. The particular manner of connecting the spindle 17 to the steering mechanism is no part of my invention and any suitable connection may be made so long as the spindle and the wheels turn in conjunction.

Horizontally arranged intermediate the arms 4, and formed integral with the bracket 5, is a tubular sleeve 24. A stub sleeve 25 is secured by means of a collar 26 within one end of the tubular sleeve 24. The collar 26 is fixed to the tubular sleeve 24 by means of suitable connecting means 27. The inner end of the stub sleeve 25 is exteriorly threaded and receives thereon a longtudinally shiftable block 28. The block 28 is provided at its lower side with an arm 29 which projects downwardly through a longitudinal slot 30 formed in the tubular sleeve 24.

The spindle 17 is provided with a recess 31 registering with a bore 32 formed through the stem 6. A pin 33 is slidably mounted within the bore 32 and has spaced parallel flanges 34 formed at its outer end. The block 28 has a reduced portion 35 at its lower end, which reduced portion 35 is received on one side of the pin 33 between the flanges 34. Ears 36 extend from the stem 6 at a point spaced below the bore 32. A lever 37 is pivoted intermediate its ends within the ears 36. The upper end of the lever 37 forms a knob 38 which is received between the ears 36 at the lower side of the pin 33.

The lower end of the lever 37 comprises a horizontal extension 39 which is adapted to be received within a vertical slot 40 formed in the hanger.

A shaft 41 is horizontally mounted within the tubular sleeve 24 and is rotatably secured therein at one end by the bearing formed by the stub sleeve 25 and at the opposite end by a plug 42 which is removably fitted into the tubular sleeve 24. A block 43 is actuated in a longitudinal direction by means of the thread 44 formed upon the exterior surface of the shaft 41. The block 43 is provided with an arm 45 which extends upward through a slot 46 at the top of the sleeve. An adjustable link 47 is pivotally connected at its lower end to the arm 45. At its upper end the link 47 is provided with a plurality of recesses 48. Securing means 49 connect through one of the recesses 48 the link 47 to a lug 50. The lug 50 is secured to the outer casing of a headlight 3 by brazing or other suitable means.

A double flexible shaft 51 extends from the dash of the vehicle 2 to the end of the tubular shaft 24. The inner flexible shaft 52 surrounds a reduced portion of the shaft 41 and is secured thereto by suitable means 53. An outer flexible shaft 54 surrounds the outer end of the stub sleeve 25 and is secured thereto by suitable means 55. The double flexible shaft 51 is provided with a control 56 which is preferably located upon the dash-board of the vehicle 2 or at some convenient point for the operator of the vehicle. The inner flexible shaft 52 surrounds and is secured to the lower reduced end 57 of an inner shaft 58 of the control 56. The upper end of the shaft 58 is provided with an operating handle 59 which is secured thereto. An outer sleeve 60 surrounds the shaft 58 and receives at its lower end secured thereto the outer flexible shaft 54. A circular plate 61 surrounds the outer sleeve 60 and is secured thereto. The circular plate 61 carries at its outer edge an operating handle 62.

In operation the control 56 provides the means for operating the mechanism to either vertically or horizontally adjust the headlights 3 and, if desired, by means of the said control the two adjustments may be simultaneous.

In operation the mechanism is as follows:
If it is desired to connect the headlights with the steering apparatus of the vehicle so that a turning of the wheels will be accompanied by a horizontal adjustment of the headlights, the driver will revolve the circular plate 61 by means of the handle 62. This in turn will revolve the outer flexible shaft 54 which will impart a rotation to the stub sleeve 25. The motion of the stub sleeve 25 will actuate the block 28 in a longitudinal direction by reason of the exterior threads at the end of the stub sleeve 25. The longitudinal movement of the block 28 will be transmitted to the pin 33 through the arm 29 and flange 34. The pin 33 will in turn be propelled through the bore 32 into the recess 31 of the spindle 17. In this position the pin 33 locks the stem to the spindle 17.

Upon a movement of the steering arm 23 to turn the wheels of the vehicle, the spindle 17 will be likewise turned through the connections 20, 21 and 22. The rotation of the spindle 17 will be transmitted to the stem 6 of the brackets 5 by the pin 33. Thus the headlights 3 will be horizontally rotated coincident and in the same direction with the turning of the wheels of the vehicle. In this manner the beam of light from the headlights 3 will always be cast in the direction in which the front wheels of the vehicle are proceeding. A reversal of the motion previously given to the handle 62 will reverse these conditions and retract the pin 33, thus leaving the stem 6 independent of the spindle 17. When the pin 33 is retracted it will rock the lever 37 and cause the horizontal extension 39 of the lever to enter the slot 40 of the hanger 8. When the pin is in the latter position, the headlight 3 will be positively fixed to the hanger 8 and will be secured against horizontal rotation.

If it is desired to adjust the headlights to change the vertical plane in which the beam of light is being thrown, the operator will rotate the handle 59. The movement of the handle 59 will be transmitted through the shaft 58 to the inner flexible shaft 52. The movement of the shaft 52 will, in turn, be transmitted to the shaft 41 and by means of the threaded portion 44 the block 43 will be longitudinally shifted. The shifting of the block 43 will be accompanied by a vertical tipping of the headlight 3 through the link 47. In this manner the operator may regulate the exact height of the beam of light cast by the headlight 3. The vertical and horizontal adjustments of the headlights 3 may be made simultaneous. This is accomplished by suitably actuating the handle 62 to force the pin 33 into the recess 31, thus connecting the spindle 17 and the bracket stem 6. A movement of the handle 59 will then be accompanied by a vertical adjustment of the headlight 3 as previously described. This will be found of advantage,—for example where the driver desires to read a sign set back from the side of the road particularly such as the street number of a house, the proper connections having been made the driver may turn the steering wheel until the headlight is turned in the direction of the sign and simultaneously therewith make the necessary vertical adjustment of the headlight.

In certain localities the law compels that the vertical adjustment of automobile headlights be within a certain predetermined maximum height. To fix the vertical adjustment of the headlight within the prescribed maximum height, a plurality of washers 63 may be inserted between the block 43 and the plug 42. The plug 42 is secured within the tubular sleeve 24 by a pin 64 and to insure against tampering with the washers 63 and a consequent destruction of the maximum vertical adjustment prescribed for the headlight 3, the pin 64 may be sealed as at 65 by the official whose duty it is to regulate the maximum vertical elevation of the light ray. As the washers 63 are inserted between the block 43 and the plug 42 the block 43 may not be longitudinally shifted further than the washers 63 will allow. Thus the vertical adjustment of the headlight 3 will be within a prescribed maximum height, the number of washers 63 to coincide with the limit prescribed by law.

Where the use of washers for this purpose is not desired and as an auxiliary adjustment thereto, if used, the plurality of recesses 48 is provided. By a variation in one of the recesses 48 used to incase the securing means 49, a variation in the initial vertical position of the headlight 3 will be had.

In practice the headlights 3 are suitably connected so that the operations above referred to will have equal effects on both headlights. The means for so connecting the headlights 3 comprise lugs 66 on the inside of the headlights 3. A rigid connecting link 67 is secured at its ends to the lugs 66. Through this link 67 a vertical or horizontal movement of one headlight 3 will be accompanied by a corresponding movement in the other headlight 3.

While I have set forth certain details of construction in the foregoing description and have illustrated but one form of my invention, it is understood that my invention is not limited to these details of construction nor to the form illustrated, but is of the breadth and scope set forth in the subjoined claims.

I claim:

1. The combination with a motor vehicle having a steering mechanism, of a dirigible lighting apparatus including connected lamps, vertically adjusting means for said lamps, means for connecting and disconnecting the lamps and the steering mechanism to move the former in consonance with the latter when connected therewith, a double flexible shaft comprising an inner flexible shaft and an outer flexible shaft, one of said shafts being operatively connected to the said vertically adjusting means and the other of said shafts being operatively connected with the said means for connecting and disconnecting the lamps and the steering mechanism, and a manual control for said double flexible shaft having an operating handle operatively connected to said inner flexible shaft and a second operating handle operatively connected to said outer flexible shaft.

2. The combination with a motor vehicle having a steering mechanism, of a dirigible lighting apparatus including connected lamps, vertical rotatable supports to which the lamps are pivoted to swing in a vertical direction, means to connect and disconnect the lamps and the steering mechanism, means to shift the lamps on their vertical pivots, a double flexible shaft having inner and outer flexible shafts, one of said shafts being operatively connected to the said means controlling the steering connection and the other of said shafts being operatively connected to the lamp adjusting means, and individual manual controls for said inner and outer flexible shafts.

3. The combination with a motor vehicle having a steering mechanism, of a dirigible lighting apparatus including connected lamps, rotatable supports to which the lamps are pivoted to swing in a vertical direction, means movable to connect the lamps with, and disconnect the same from, the said steering mechanism, means for shifting the lamps vertically upon their pivots, and manual controlling means independent of each other for actuating the said means controlling the steering connection and the lamp adjusting means.

4. A dirigible lighting apparatus for motor vehicles, including a lamp supporting bracket to which a lamp is pivoted to swing in a vertical direction, a tubular sleeve mounted on said bracket, a stub sleeve rotatably mounted in one end of said tubular sleeve, a block received within said tubular sleeve and operatively associated with said stub sleeve to be longitudinally shifted upon rotation of said stub sleeve by a thread formed on said stub sleeve, means actuated by a shifting of said block to connect said bracket to means adapted to turn said supporting bracket, a shaft rotatably mounted within said tubular sleeve and supported at one end within said stub sleeve, a second block received within said tubular sleeve and operatively associated with said shaft to be longitudinally shifted upon rotation of said shaft by a thread formed on said shaft, a link connecting said second named block and said lamp adapted to swing said lamp in a vertical direction on a longitudinal movement of said block, and means to rotate said stub sleeve and said shaft independent of each other.

5. A dirigible lighting apparatus for motor vehicles, including a lamp supporting bracket to which a lamp is pivoted to swing in a vertical direction, a tubular sleeve mounted on said bracket, a shaft rotatably mounted within said tubular sleeve, a block received within said tubular sleeve and adapted to be longitudinally shifted on a rotation of said shaft, a link connecting said second named block and said lamp adapted to swing said lamp in a vertical direction on a longitudinal movement of said block, means to rotate said block, a cap for said sleeve, a plurality of washers inserted in said tubular sleeve between said block and said cap to limit the swing of said lamp within a predetermined maximum height, and a seal to prevent the removal of said washers.

Signed at Los Angeles, California this 24th day of April 1919.

JAMES M. CALKINS.

Witnesses:
LEONARD S. LYON,
L. BELLE WEAVER.